US010440098B1

United States Patent
Bryer et al.

(10) Patent No.: US 10,440,098 B1
(45) Date of Patent: Oct. 8, 2019

(54) DATA TRANSFER USING IMAGES ON A SCREEN

(71) Applicant: Palantir Technologies Inc., Palo Alto, CA (US)

(72) Inventors: Arlo Bryer, London (GB); Chris Brockington-Hill, London (GB); Jacek Lach, London (GB)

(73) Assignee: Palantir Technologies Inc., Palo Alto, CA (US)

(*) Notice: Subject to any disclaimer, the term of this patent is extended or adjusted under 35 U.S.C. 154(b) by 734 days.

(21) Appl. No.: 15/045,147

(22) Filed: Feb. 16, 2016

Related U.S. Application Data

(60) Provisional application No. 62/272,612, filed on Dec. 29, 2015.

(51) Int. Cl.
H04N 5/225 (2006.01)
H04L 29/08 (2006.01)

(52) U.S. Cl.
CPC .......... *H04L 67/06* (2013.01); *H04L 67/1093* (2013.01); *H04N 5/225* (2013.01)

(58) Field of Classification Search
None
See application file for complete search history.

(56) References Cited

U.S. PATENT DOCUMENTS

| | | | |
|---|---|---|---|
| 6,643,613 B2 | 11/2003 | McGee et al. | |
| 7,028,223 B1 | 4/2006 | Kolawa et al. | |
| 8,296,477 B1* | 10/2012 | Polk | G06Q 99/00 705/35 |
| 8,799,867 B1 | 8/2014 | Peri-Glass et al. | |
| 9,223,773 B2 | 12/2015 | Isaacson | |
| 9,454,605 B1* | 9/2016 | Mello | G06F 21/36 |
| 2004/0153837 A1 | 8/2004 | Preston et al. | |
| 2005/0251786 A1 | 11/2005 | Citron et al. | |
| 2005/0269411 A1* | 12/2005 | Vesikivi | G06K 7/10851 235/462.01 |
| 2006/0071077 A1* | 4/2006 | Suomela | G06K 7/1095 235/462.01 |
| 2006/0129992 A1 | 6/2006 | Oberholtzer et al. | |
| 2009/0199047 A1 | 8/2009 | Vaitheeswaran et al. | |
| 2009/0319418 A1 | 12/2009 | Herz | |
| 2010/0010912 A1 | 1/2010 | Jones et al. | |
| 2010/0079461 A1 | 4/2010 | Breeds et al. | |

(Continued)

OTHER PUBLICATIONS

Official Communication in New Zealand Application No. 627962 dated Aug. 5, 2014.

(Continued)

*Primary Examiner* — William C Vaughn, Jr.
*Assistant Examiner* — Joseph Daniel A Towe
(74) *Attorney, Agent, or Firm* — Schwegman Lundberg & Woessner, P.A.

(57) ABSTRACT

In various example embodiments, a system and method for data transfer using images are provided herein. An image is received from a source device. Moreover, the image represents information stored in a memory of the source device. The image is generated based on an application that converts the information into the image. Further information is then generated on a destination device based on the received image. The further information is a duplicate of the information that is stored in the memory of the source device.

20 Claims, 12 Drawing Sheets

(56) References Cited

U.S. PATENT DOCUMENTS

| | | |
|---|---|---|
| 2012/0330845 A1* | 12/2012 | Kang .................... G06Q 40/02 |
| | | 705/71 |
| 2013/0024731 A1 | 1/2013 | Shochat et al. |
| 2013/0092738 A1* | 4/2013 | Blasinski ........... G06K 19/0614 |
| | | 235/462.04 |
| 2013/0117802 A1 | 5/2013 | Fendt |
| 2013/0251233 A1 | 9/2013 | Yang et al. |
| 2014/0084067 A1* | 3/2014 | Vanderhulst ......... H04B 10/116 |
| | | 235/462.01 |
| 2014/0129936 A1 | 5/2014 | Richards et al. |
| 2014/0268244 A1 | 9/2014 | Sheridan et al. |
| 2015/0074050 A1 | 3/2015 | Landau et al. |
| 2015/0112641 A1 | 4/2015 | Faraj |
| 2015/0161406 A1 | 6/2015 | Fox et al. |
| 2015/0186653 A1 | 7/2015 | Gkoulalas-Divanis et al. |
| 2015/0261970 A1* | 9/2015 | Mevec .................. G06F 21/606 |
| | | 726/29 |

OTHER PUBLICATIONS

Official Communication for Great Britain Patent Application No. 1413935.6 dated Dec. 21, 2015.
Official Communication for U.S. Appl. No. 14/887,071 dated Mar. 21, 2016.
Official Communication for U.S. Appl. No. 14/877,229 dated Mar. 22, 2016.

* cited by examiner

DATA TRANSFER USING IMAGES ON A SCREEN

RELATED APPLICATION

This application claims the priority benefit of U.S. Provisional Patent Application No. 62/272,612, filed Dec. 29, 2015, which is incorporated herein by reference in its entirety.

TECHNICAL FIELD

Embodiments of the present disclosure relate generally to data processing and, more particularly, but not by way of limitation, to data transfer using images on a screen.

BACKGROUND

Conventionally, data is transferred from one machine to another using an external storage device. Data is also transferred from one machine to another over a network.

BRIEF DESCRIPTION OF THE DRAWINGS

Various ones of the appended drawings merely illustrate example embodiments of the present disclosure and cannot be considered as limiting its scope.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various example embodiments of the subject matter discussed herein. It will be evident, however, to those skilled in the art, that embodiments of the subject matter may be practiced without these specific details.

In various example embodiments, a camera receives images that are displayed on a screen of a first device. Moreover, the images themselves are generated using an application that is executed on the first device. Once the images are generated, the first device displays the images as a part of a stream of images. In other words, the images are created by the first device and thereafter displayed as a stream of images from the first device (e.g., displayed on a screen of the first device). The application converts data stored on the device into the images that are displayed on the screen of the device. In some example embodiments, a system uses various techniques to verify that the images are successfully received by the camera. Once received by the camera, the system uses the images to generate information on a second device. The generated information, in various example embodiments, is a duplicate of the data stored on the first device. In some instances, the first device may be a device without access to the Internet or to a network. In further instances, the first device may be a device without compatibility for external storage (e.g., compact disc, Universal Serial Bus flash drive, and the like). Accordingly, the transfer of data using the images is the most effective and sometimes only way of receiving data stored on the first device.

Figure 1:
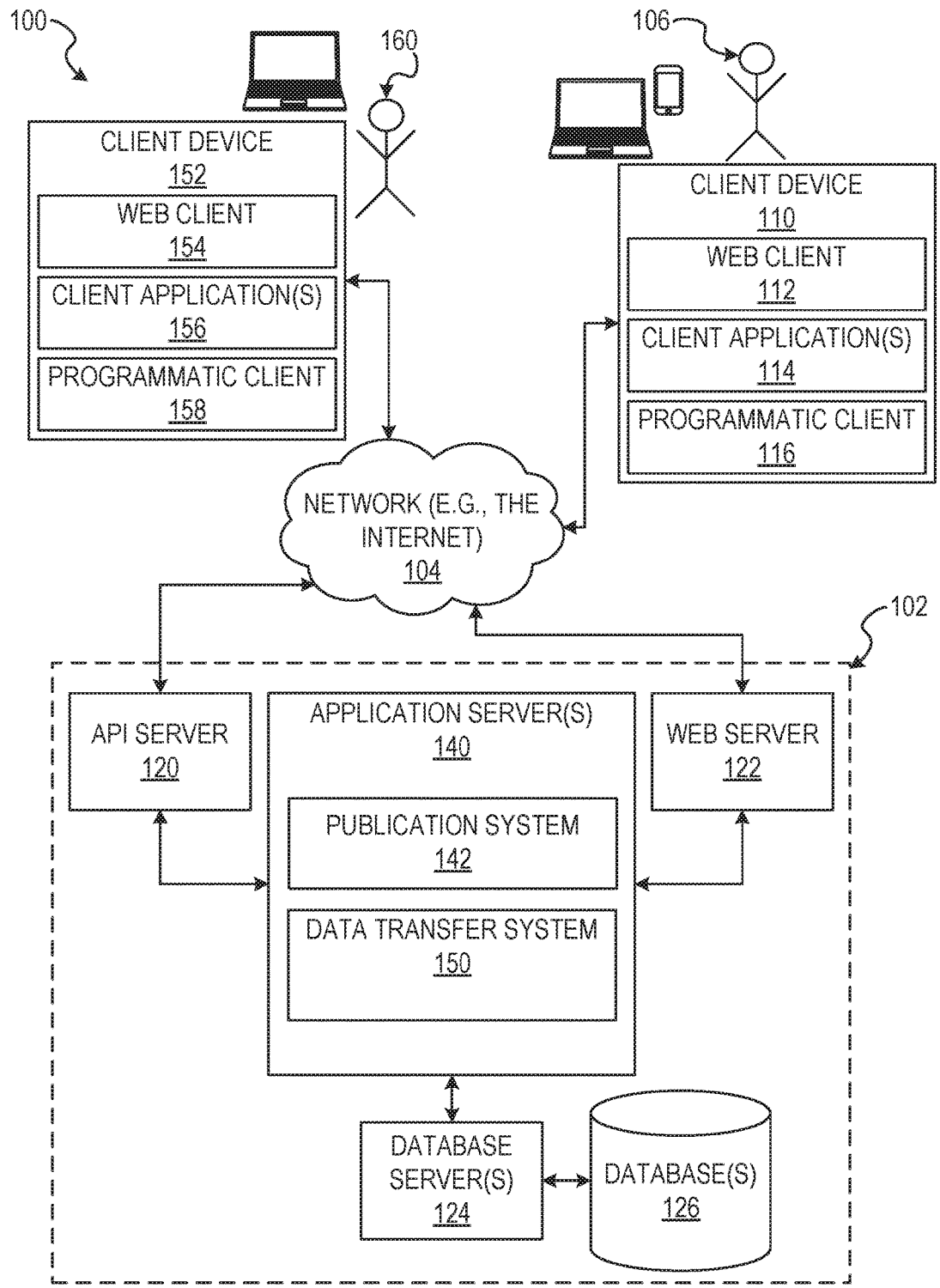
FIG. 1 is a block diagram illustrating a networked system, according to some example embodiments.

With reference to FIG. 1, an example embodiment of a high-level client-server-based network architecture 100 is shown. A networked system 102, in the example forms of a network-based publication system and a network-based data transfer system, provides server-side functionality via a network 104 (e.g., the Internet or wide area network (WAN)) to one or more client devices 110. FIG. 1 illustrates, for example, a web client 112 (e.g., a browser), a client application 114, and a programmatic client 116 executing on client device 110.

The client device 110 may comprise, but is not limited to, a mobile phone, desktop computer, laptop, portable digital assistants (PDAs), smart phones, tablets, laptops, microprocessor-based or programmable consumer electronics, game consoles, set-top boxes, or any other communication device that a user may utilize to access the networked system 102. In some embodiments, the client device 110 comprises a display module (not shown) to display information (e.g., in the form of user interfaces). In further embodiments, the client device 110 may comprise one or more of a touch screens, accelerometers, gyroscopes, cameras, microphones, global positioning system (GPS) devices, and so forth. The client device 110 may be a device of a user that stores data which is converted into an image and displayed on a screen of the client device. For example, one or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

Each of the client devices 110 include one or more applications (also referred to as "apps") such as, but not limited to, a web browser, messaging application, electronic mail (email) application, a data transfer application, and the like.

One or more users 106 may be a person, a machine, or other means of interacting with the client device 110. In example embodiments, the user 106 is not part of the network architecture 100, but interacts with the network architecture 100 via the client device 110 or other means. For instance, the user 106 provides input (e.g., touch screen input or alphanumeric input) to the client device 110 and the input is communicated to the networked system 102 via the network 104. In this instance, the networked system 102, in response to receiving the input from the user 106, communicates information to the client device 110 via the network 104 to be presented to the user 106. In this way, the user 106 can interact with the networked system 102 using the client device 110.

An application program interface (API) server 120 and a web server 122 are coupled to, and provide programmatic and web interfaces respectively to, one or more application servers 140. The application servers 140 hosts a publication system 142 and a data transfer system 150, each of which may comprise one or more modules or applications and each of which may be embodied as hardware, software, firmware, or any combination thereof. The application servers 140 are, in turn, shown to be coupled to one or more database servers 124 that facilitate access to one or more information storage repositories or database(s) 126. In an example embodiment, the databases 126 are storage devices that store information to be posted (e.g., publications or listings) to the publication system 142. The databases 126 may also store digital item information in accordance with example embodiments.

Additionally, a third party application 132, executing on third party server(s) 130, is shown as having programmatic access to the networked system 102 via the programmatic interface provided by the API server 120. For example, the third party application 132, utilizing information retrieved from the networked system 102, supports one or more features or functions on a website hosted by the third party. The third party website, for example, provides one or more promotional, publication, or payment functions that are supported by the relevant applications of the networked system 102.

The publication system 142 provide a number of publication functions and services to users 106 that access the networked system 102. The data transfer system 150 provides services that transfer data to users 106 that access the networked system 102. While the publication system 142 and data transfer system 150 are shown in FIG. 1 to both form part of the networked system 102, it will be appreciated that, in alternative embodiments, each of the publication system 142 and the data transfer system 150 may form part of a service that is separate and distinct from the networked system 102.

The data transfer system 150 provides functionality to support transfer of data from a source device to a destination device. Each of the source device and the device may be embodied in the form of a client device (e.g., client device 110). Further, while the client-server-based network architecture 100 shown in FIG. 1 employs a client-server architecture, the present subject matter is of course not limited to such an architecture, and could equally well find application in a distributed, or peer-to-peer, architecture system, for example. The publication system 142, and data transfer system 150 could also be implemented as standalone software programs, which do not necessarily have networking capabilities.

The web client 112 accesses the publication system 142 and the data transfer system 150 via the web interface supported by the web server 122. Similarly, the programmatic client 116 accesses the various services and functions provided by the publication system 142 and the data transfer system 150 via the programmatic interface provided by the API server 120.

Figure 2:
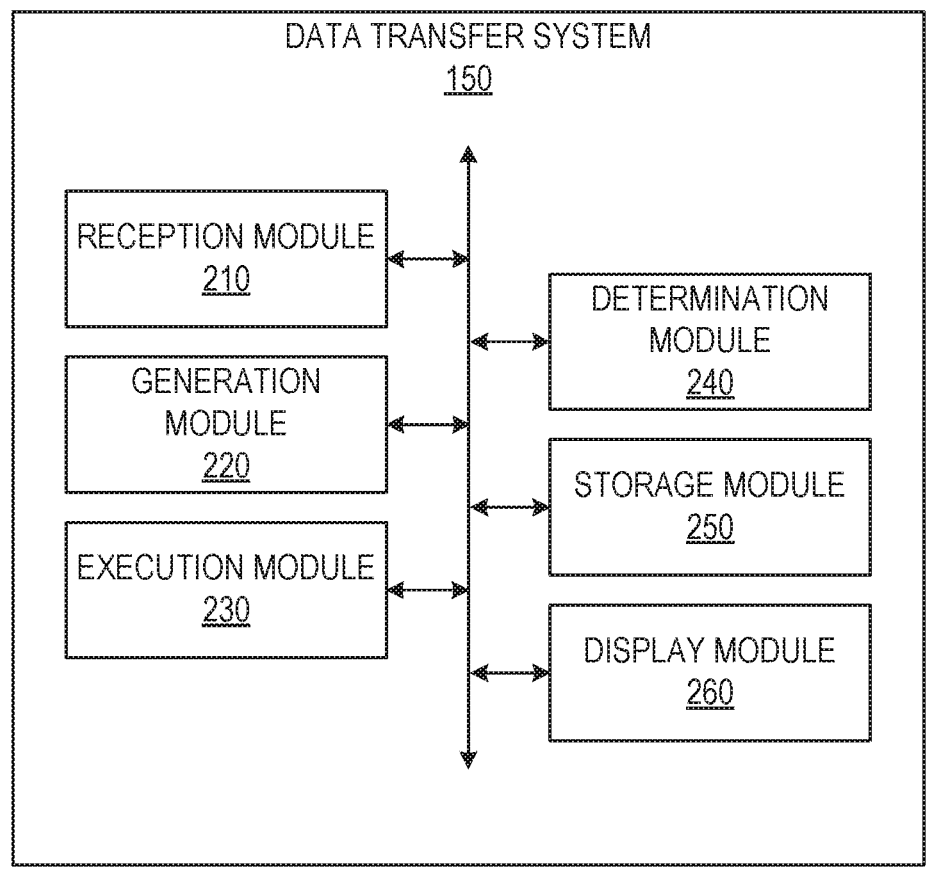
FIG. 2 is a block diagram illustrating components of a data transfer system, according to some example embodiments.

FIG. 2 is a block diagram illustrating components of the data transfer system 150, according to some example embodiments. The data transfer system 150 is shown as including a reception module 210, a generation module 220, an execution module 230, a determination module 240, a storage module 250, and a display module 260 all configured to communicate with each other (e.g., via a bus shared memory, or a switch). Any one or more of the modules described herein may be implemented using hardware (e.g., one or more processors of a machine) or a combination of hardware and software. For example, any module described herein may configure a processor (e.g., among one or more processors of a machine) to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

In various example embodiments, the reception module 210 is configured to receive an image or stream of images that represents information stored in a memory of a source device (e.g., sender device). The memory of the source device includes a hard drive or disk that is housed within the source device. Also, the image is received by the reception module 210 through the use of a camera.

In various example embodiments, the generation module 220 is configured to generate information on a destination device (e.g., receiver device). Moreover, the generation module 220 is further configured to generate the information on the destination device using the image received by the reception module 210.

In various example embodiments, the execution module 230 is configured to cause execution of an application on the destination device. The application may be a software program or programming script that is downloaded onto the destination device. Once downloaded, the execution module 230 runs the software program or programming script downloaded onto the destination device. In further example embodiments, the operations described herein may be performed by the data transfer system 150 without the use of the execution module 230.

In various example embodiments, the determination module 240 is configured to determine that the receiving of the image from the source device is errorless.

In various example embodiments, the storage module 250 is configured to store the image in a database. The storage module 250 is further configured to retrieve any images that were previously stored in the database. The stored images may be used by the generation module 220 to generate the information on the destination device.

In various example embodiments, the display module 260 is configured to cause display of a message in a user interface of a device (e.g., the source device, the destination device, and the like).

Figure 3:
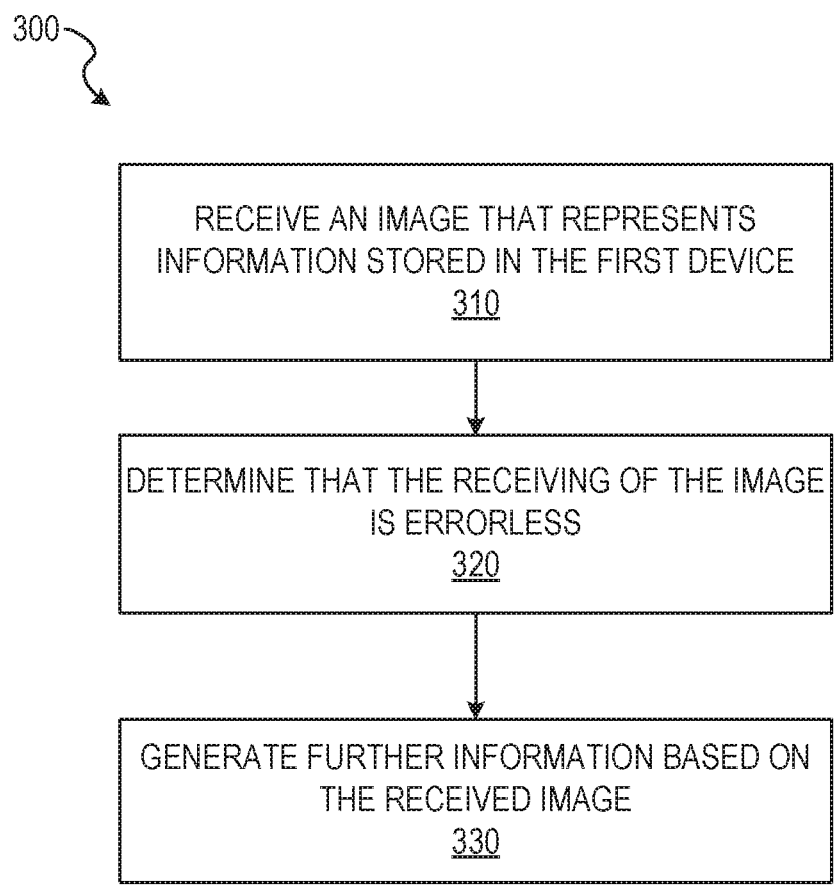
FIG. 3-6 are flowcharts illustrating operations of the data transfer system in performing a method of generating information based on a received image, according to some example embodiments.

FIG. 3-6 are flowcharts illustrating operations of the data transfer system 150 in performing a method 300 of generating information based on a received image, according to some example embodiments. Operations in the method 600 may be performed by the data transfer system 150, using modules described above with respect to FIG. 2. As shown in FIG. 3, the method 300 includes operations 310, 320, and 330.

At operation 310, the reception module 210 receives an image that represents information that is stored in a memory of the source device. The image is a result of the conversion performed by an application that is executed on the source device. In other words, the image is generated by the application executed on the source device. More specifically, the application is software code that is configured to convert the information from the source device into the image. In some instances, the code is written using a programming language, such as Python. Moreover, the information being converted is stored in the memory of the source device. The information may include any data that is capable of being stored in the memory of the source device. For example, the information includes text documents, spreadsheets, graphical images, video clips, and the like. As another example, the information is a file that includes textual information. In various example embodiments, a stream of images (e.g., one or more images) is received by the reception module 210.

In various embodiments, the generated image depicts one or more bits and each of the one or more bits is depicted in a respective color. In further example embodiments, the image depicts objects that are arranged according to a predetermined format. For instance, the application arranges the objects in the image according to the predetermined format. Moreover, the arrangement of the objects is performed as the information from the source device is being converted by the application into the depicted objects. In an example embodiment, the image depicts one or more squares. Moreover, the one or more squares is arranged in the image according to a layout that resembles a checkerboard.

In various example embodiments, the application converts the information into a stream of images (e.g., one or more images). In other words, the image includes the stream of images. Accordingly, the reception module 210 is further configured to receive the stream of images.

In various embodiments, the image is displayed on a screen of the source device. Accordingly, the reception module 210 receives the image from the screen of the source device. Moreover, the reception module 210, in various example embodiments, is further configured to capture the image from the screen of the source device using a camera. In other words, the reception module 210 has access to the camera and utilizes the camera to facilitate the capture of the image from the screen of the source device. In further embodiments, any other image capturing tool or device other than a camera may also be used by the reception module 210 to receive the image displayed on the screen of the source device.

Moreover, the size of the screen of the source device alters a resolution of the image. Accordingly, the size of the screen of the source device affects the receiving of the image from the source device, as further explained below.

In further example embodiments, the reception module 210 receives the image from an intermediate device. The intermediate device may also include a camera that captures the image from the screen of the source device. Further, the intermediate device sends the captured image to the reception module 210. Alternatively, the camera may be attached to the destination device.

At operation 320, the determination module 240 determines that the image is successfully received from the source device by the reception module 210 at operation 320. In other words, the determination module 240 determines that the receiving of the image is errorless. As further explained below, this may include a determination that the image is properly aligned within a view of the camera. This may also include a determination that the image is displayed for at least a minimum duration of time needed for the camera to capture the image.

The determination module 240, in various example embodiments, also determines that a resolution of the image exceeds a minimum threshold resolution. The minimum threshold resolution corresponds to a minimum resolution that which the camera is able to successfully capture the image. This may include determining that each of the bits is displayed in the images with sufficient detail and can be recognized by the camera of the destination device. In various embodiments, the determination module 240 also determines that a fluorescence of the screen of the source device exceeds a minimum threshold fluorescence.

In various embodiments, the display module 260 causes display of a message on a screen of a capturing device upon a determination by the determination module 240 that the receiving of the image is not errorless. For example, if the image is not properly aligned within the view of the camera, the display module 260 causes display of an error message on the screen of the capturing device.

At operation 330, the generation module 220 generates further information based on the received image. In various embodiments, the generation module 220 generates the further information on a destination device. Moreover, the further information is a duplicate version of the information that is stored in the memory of the source device. In other words, the information from the source device is generated as further information on the destination device as a result of the method 300 shown in FIG. 3. In various example embodiments, the destination device is a device separate from the data transfer system 150. Alternatively, the destination device may reside as part of the data transfer system 150. In various example embodiments, the execution module 230 causes execution of a further application on the destination device in order to perform the generation of the further information on the destination device at operation 330. In other words, the further application is configured to convert the received image into data that corresponds to the further information. The further application, like the application on the source device, is coded using software, such as Python.

In the case that the image includes a stream of images, in various example embodiments, the generation module 220 performs the generation of the further information after receiving a last image from the stream of images. In other words, the generation module 220 generates the further information after the entire stream of images is received. In some embodiments, if the intermediate device is being used to capture the stream of images, then the stream of images may be saved as a video file created by the intermediate device. The stream of images or the video file is then sent from the intermediate device to the reception module 210. Alternatively, the generation module 220 performs generation of the further information after receiving a first image from the stream of images. In other words, the generation module 220 generates the further information in real time as they are being received at the reception module 210. For example, as soon as the camera captures each image, they are processed and used by the generation module 220 to generate the further information.

Figure 4:
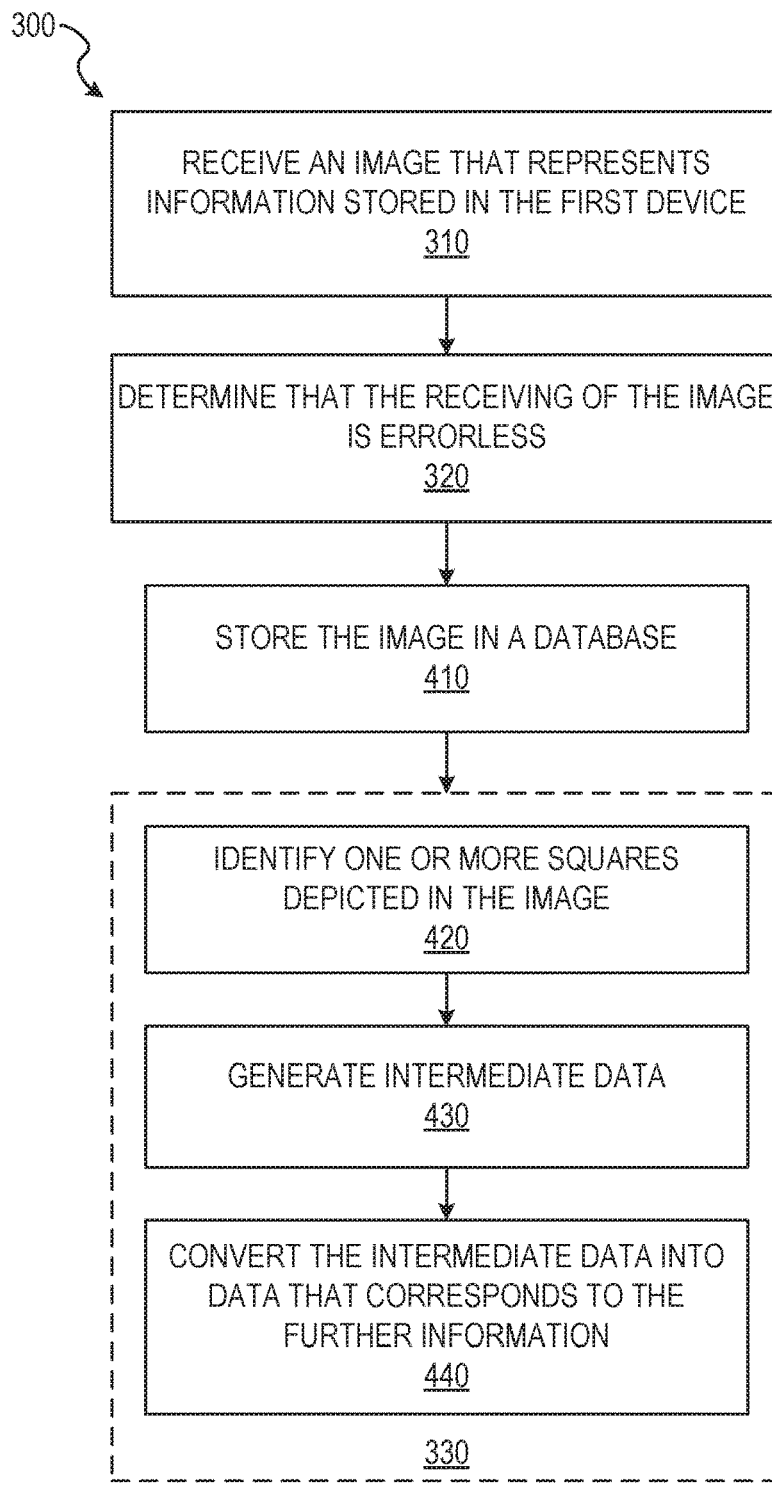

As shown in FIG. 4, the method 300 may include one or more of operations 410, 420, 430, and 440. The operation 410 may be performed prior to the operation 330. Moreover, the operations 420, 430, and 440 may each be performed by the generation module 220 as part of the operation 330.

At operation 410, the storage module 250 stores the received image in a database. This ensures that a copy of the received image is saved in the database or any other storage device (e.g., hard drive or memory). In some embodiments, the generation of the further information is not performed until a specific length of time has elapsed. Accordingly, the received image may be retrieved by the storage module 250 from the database after the specific length of time and when generation of the further information is performed.

At operation 420, the generation module 220 identifies the one or more bits depicted in the image. For example, the generation module 220 counts the number of the one or more bits depicted in the image. As another example, the generation module 220 identifies the colors of the one or more bits depicted in the image.

At operation 430, the generation module 220 generates intermediate data based on the identified one or more bits depicted in the image. In other words, the generation module 220 analyzes the identified one or more bits depicted in the image in order to generate the intermediate data. The intermediate data can be metadata that provides details about the one or more bits depicted in the image. For example, in one embodiment, the intermediate data is the count of the number of bits depicted in the image. In further embodiments, the intermediate data is data that indicates the colors depicted in the image. In further embodiments, the intermediate data will indicate a shape of the objects depicted in the image (e.g., square, oval, diamond, and the like). In some embodiments, the number of squares is correlated with an amount of information depicted in the image and is inversely related to a number of images needed to represent the information from the source device.

At operation 440, the generation module 220 converts the intermediate data into data that corresponds to the further information. In other words, using the intermediate data, the generation module 220 is able to generate the further information. For example, the number of squares may correspond to a certain value that is then used to generate the further information. As another example, the color of the squares may correspond to another value that is then used to generate the further information.

Figure 5:
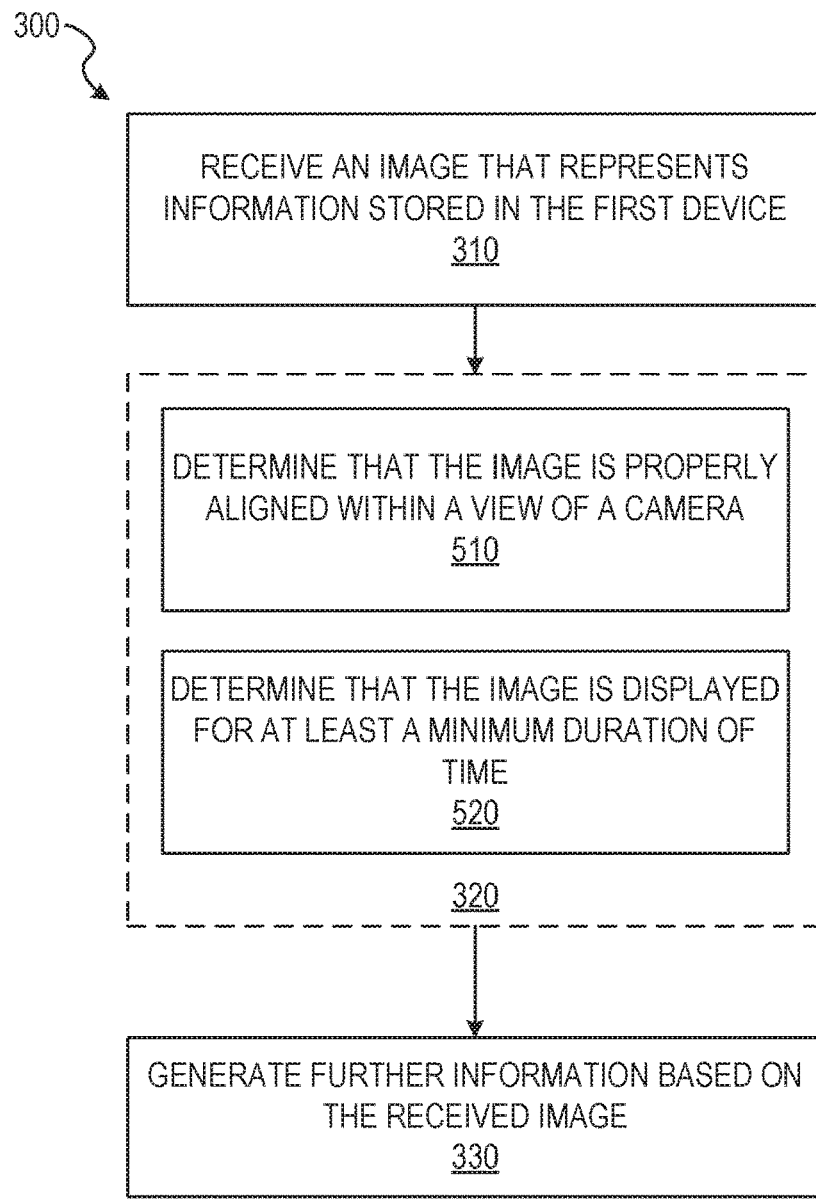

As shown in FIG. 5, the method 300 may include one or more of operations 510 and 520. Moreover, the operations 510 and 520 may each be performed by the determination module 240 as part of the operation 320.

At operation 510, the determination module 240 determines that the image is properly aligned within a view of a camera. In some embodiments, the camera is attached to the destination device. In further embodiments, the camera is attached to a separate device that is being used to capture the image. Proper alignment of the images allows for the analysis of the image to be correctly performed by the generation module 220 at operation 340. In some instances alignment of the image includes an angle of the image within the view of the camera. For example, the image may appear tilted within the view of the camera. In some instances, alignment of the image includes a distance of the camera from the image being displayed on the screen of the source device. For example, if the camera is too close to the image, then only a portion of the image will appear in the view of the camera. Accordingly, the determination module 240 determines that the angle of the image matches a predetermined angle. The determination module 240 also determines that the distance of the camera from the image at within a certain distance such that the entirety of the image appears in the view of the camera.

At operation 520, the determination module 240 determines that the image is displayed for at least a minimum duration of time. The minimum duration of time corresponds to the minimum duration of time needed for the camera to capture or receive the image. In various example embodiments, this includes determining that the image is within a view of the camera of the destination device for the minimum duration of time.

In further example embodiments, the minimum duration of time depends on the quality of the image displayed on the screen of the source device. Lower quality images (e.g., fluorescence, size) may be more difficult for the camera to capture. As a result, more time is required for the camera to capture them successfully. Alternatively, higher quality images are more easily captured by the camera. As a result, less time is required for the camera to capture them successfully. As explained above, the size of the screen of the source device may affect the quality of the image displayed on the screen of the source device.

In the case of the image including a stream of images, the determination module 240 determines that the receiving of the stream of images in its entirety is errorless. In this regard, the determination module 240 is further configured to detect if an image from the stream of images is missing (e.g., detect that an image from the stream of images is dropped during the receiving of the stream of images).

Figure 6:
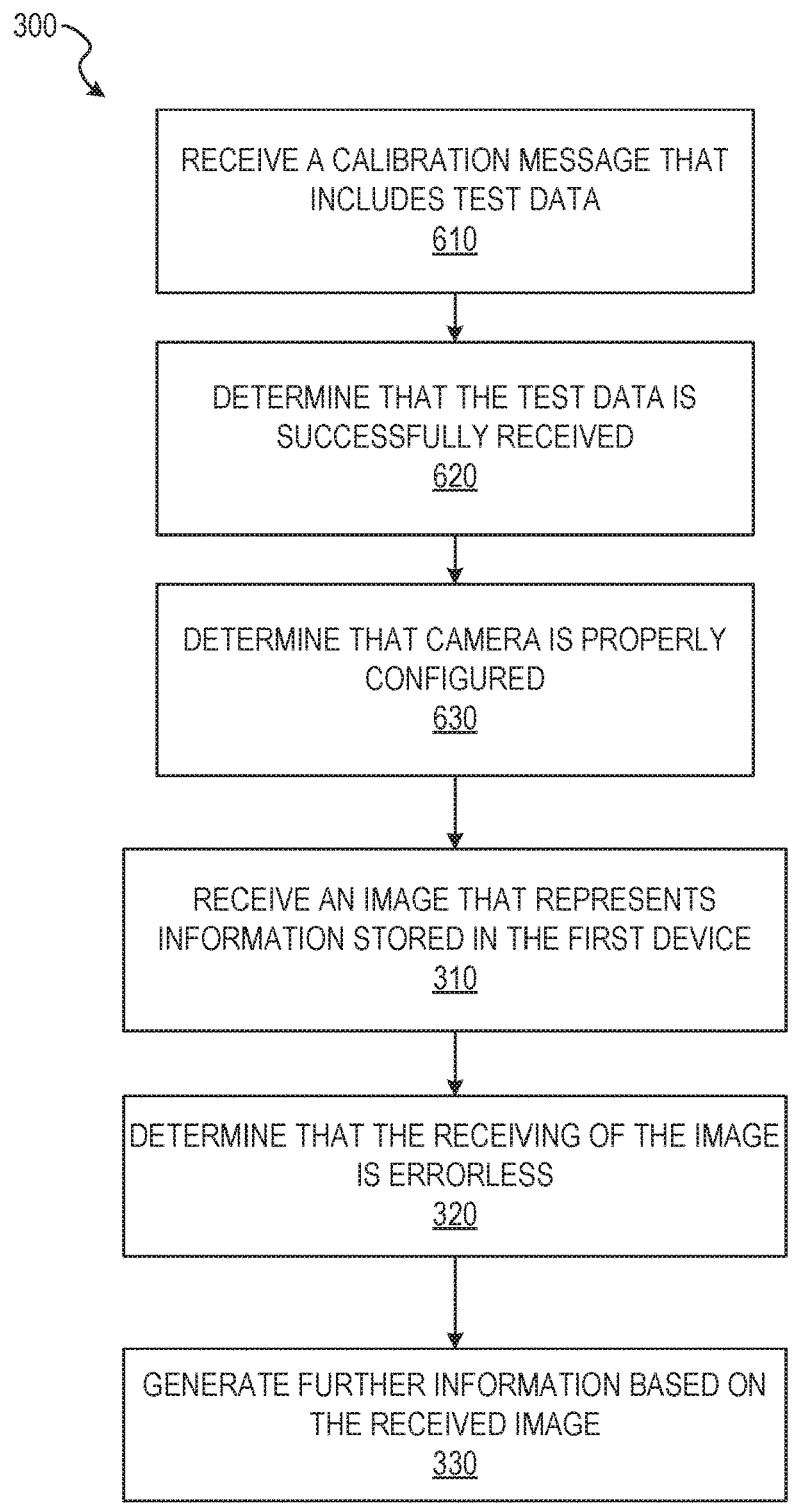

As shown in FIG. 6, the method 300 may include one or more of operations 610, 620, and 630. Moreover, each of the operations 610, 620, and 630 may be performed prior to the operation 310 of FIG. 3.

At operation 610, the reception module 210 receives a calibration message that includes test data. Also, in some embodiments, the test data includes a test marker. The test marker is used to properly configure the camera being used to capture the image. For example, the test data or test marker may only be received by the camera when the camera is at a predetermined distance from a screen of the source device. As another example, the test data or test marker may only be received by the camera when the camera is at a predetermined angle from the screen of the source device.

At operation 620, the determination module 240 determines that the test data is successfully received by the camera. In other words, the determination module 240 may determine that the test marker included in the test data is successfully received by the destination device. Moreover, if the test data is successfully received, then the determination module 240 concludes that the camera is properly configured to receive the image from the screen of the source device. Alternatively, if the determination module 240 determines that test data is not successfully received by the destination device, the determination module 240 concludes that the camera is not properly configured to receive the image from the screen of the source device.

At operation 630, the determination module 240 determines that the camera is properly configured to receive the image. Once determined as being properly configured, the camera is used by the reception module 210 to receive the image that represents information stored in the first device, as performed at operation 310.

Figure 7:
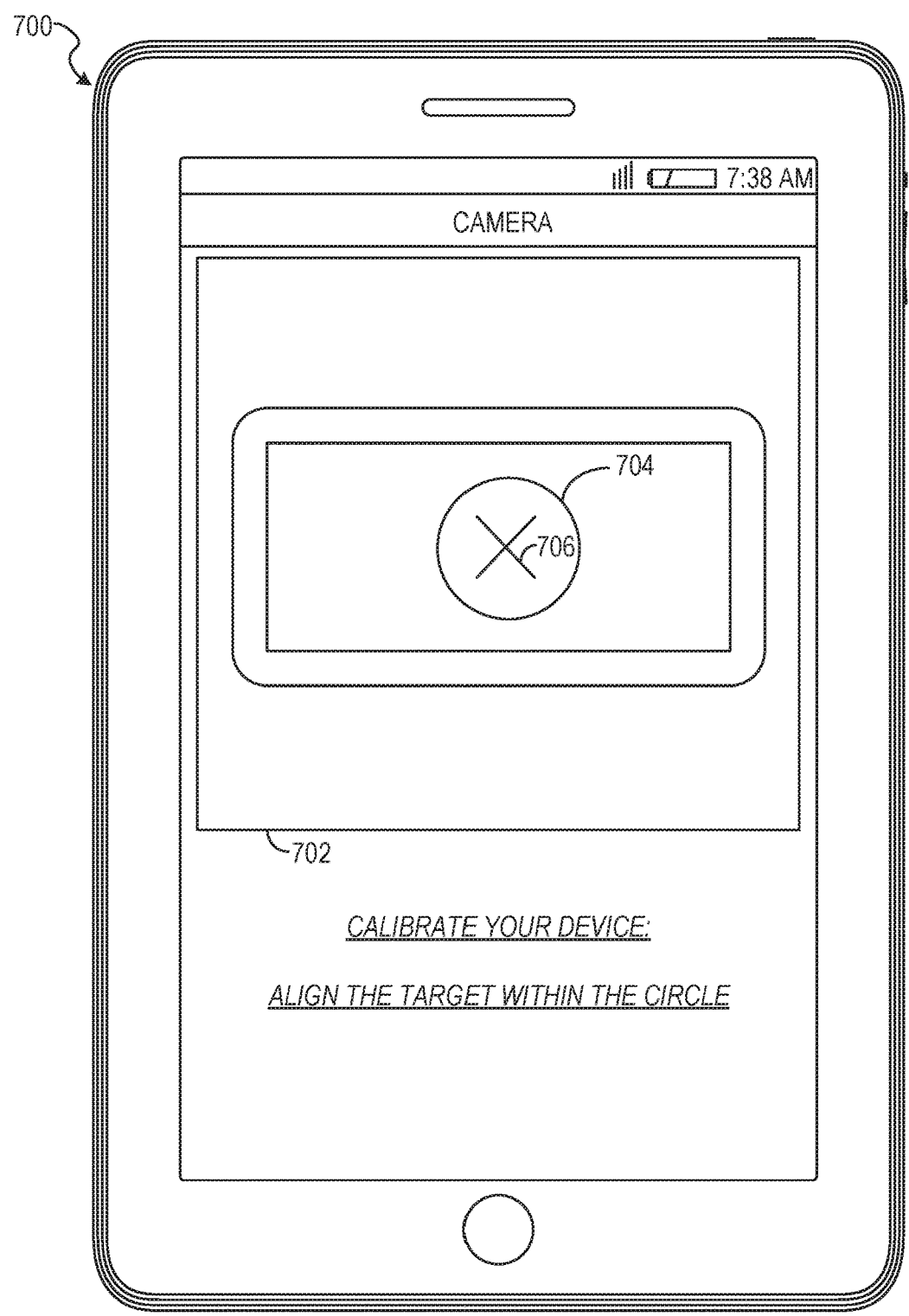
FIG. 7 is a block diagram that depicts an example user interface of a device with an attached camera, according to some example embodiments.

FIG. 7 is a block diagram 700 that depicts an example user interface of a device with an attached camera, according to some example embodiments. In particular, the user interface of the device includes a window 702 that shows a view of the camera attached to the device. Moreover, the camera is viewing a calibration message displayed on a screen of a separate device (e.g., source device). In other words, the user interface includes the window 702 that shows the view of the camera that is viewing the calibration message. As shown, the user interface also includes a cursor 704 and a target 706 displayed on screen of the separate device. The target 706 is displayed on the screen of the separate device that is sending the calibration message. In various example embodiments, once the camera is positioned such that the target 706 appears within the cursor 704, the determination module 240 determines that the camera is properly configured. In various example embodiments, the device of the user interface depicted in FIG. 7 is also a destination device.

Figure 8:
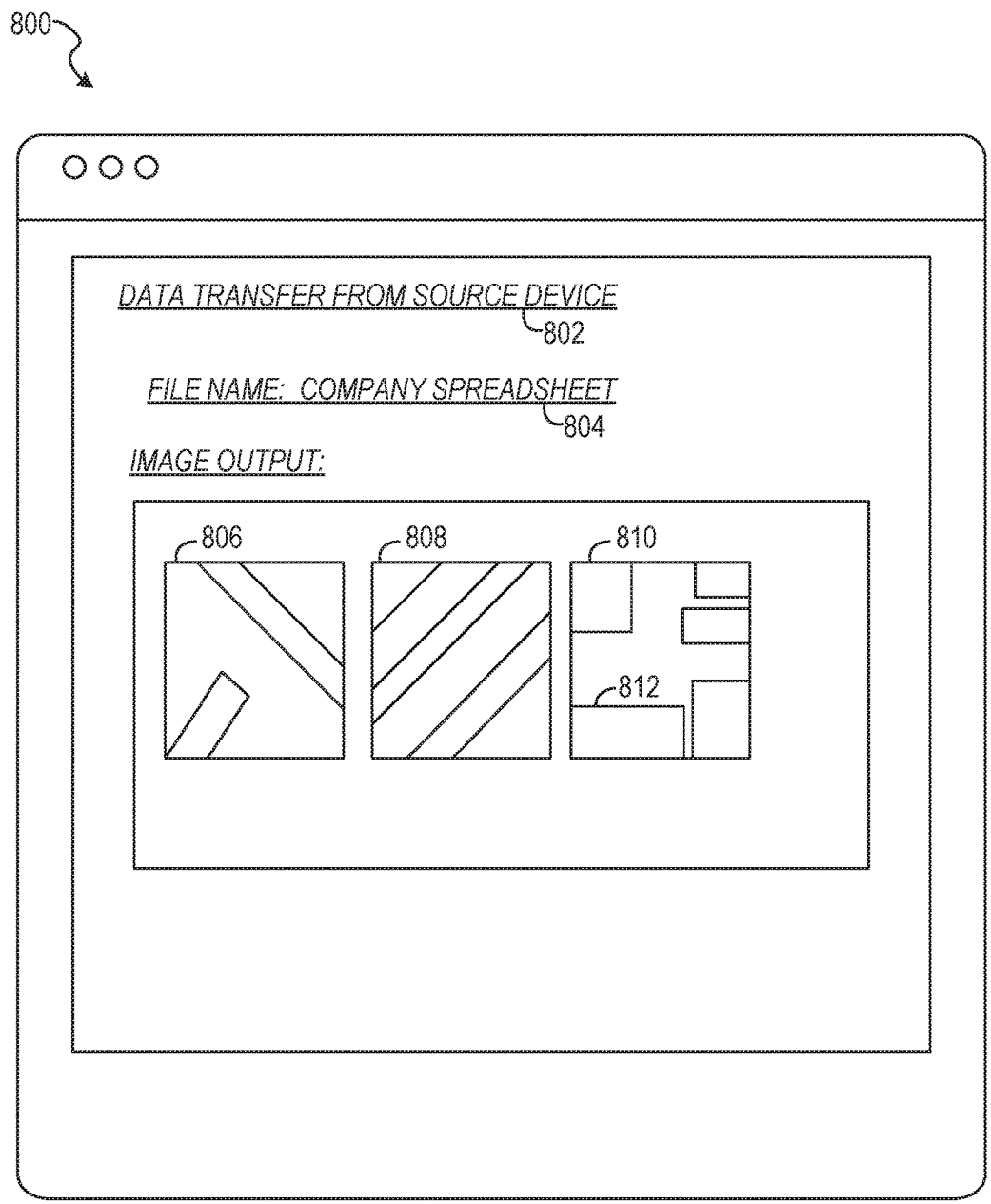
FIG. 8 is a block diagram that depicts an example user interface of a source device, according to some example embodiments.

FIG. 8 is a block diagram 800 that depicts an example user interface of a source device, according to some example embodiments. The example user interface includes a title 802, a file name 804, and an image output. The image output may include a first image 806, a second image 808, and a third image 810. The first image 806, the second image 808, and the third image 810 are generated as a result of an application that is executed on the source device. The first image 806, the second image 808, and the third image 810 represents the company spreadsheet stored on the source device, as indicated by the file name 804. Moreover, each of the first image 806, the second image 808, and the third image 810 depicts one or more bits or shapes. For example, as shown in FIG. 8, the third image 810 depicts various shapes including shape 812. The number of shapes depicted in each of the image is correlated with an amount of information conveyed by the image and in some embodiments reduces the amount of squares needed to be captured by the camera. For example, as the number of shapes increases, the number of images used to represent the information from the source device may decrease. Also, although not shown in FIG. 8, in further embodiments, the first image 806, the second image 808, and the third image 810 may be displayed as separate frames within a video or a slide show.

Figure 9:
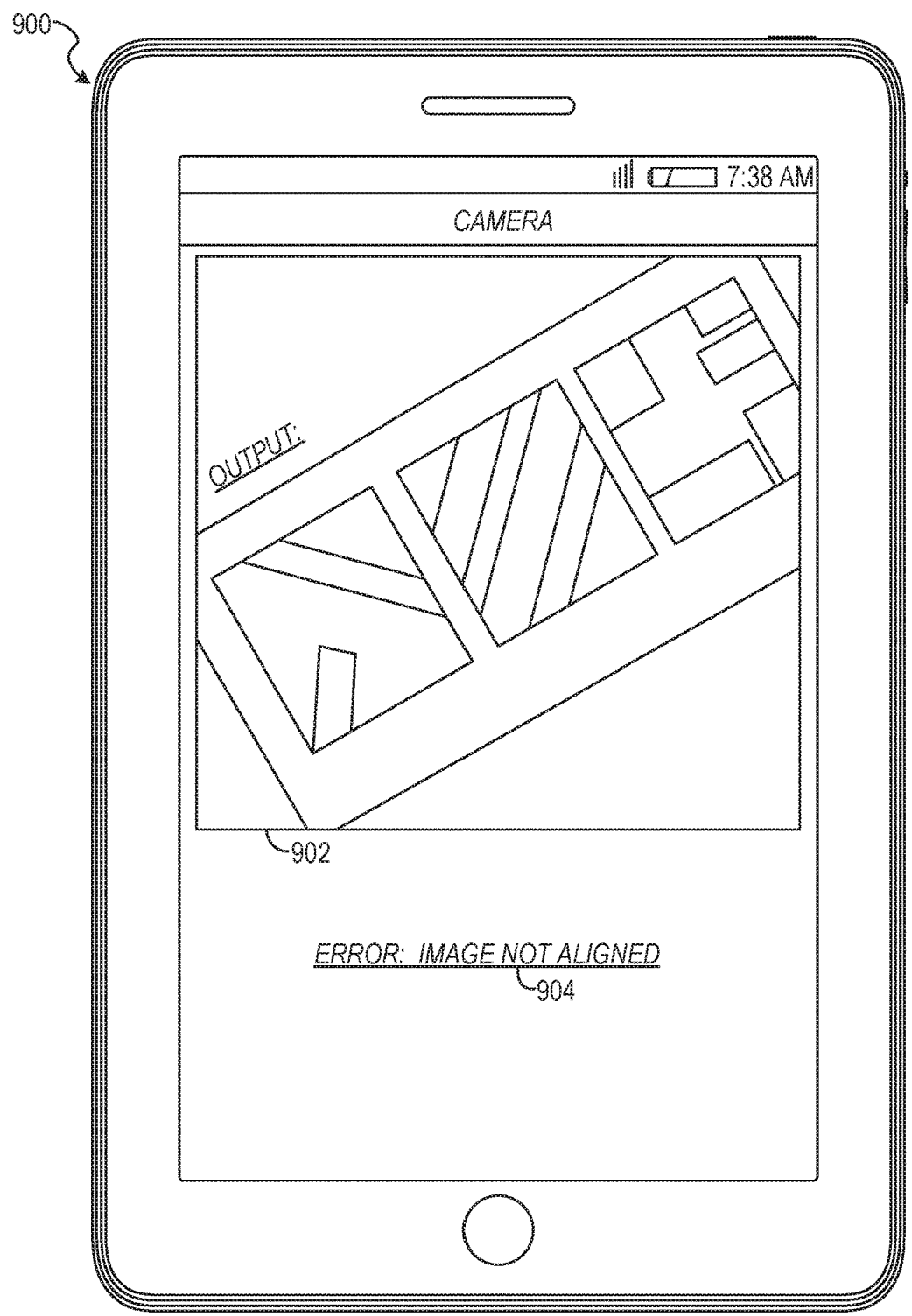
FIG. 9 is a block diagram that depicts an example user interface of a device with an attached camera, according to some example embodiments.

FIG. 9 is a block diagram 900 that depicts an example user interface of a device with an attached camera, according to some example embodiments. In various example embodiments, the device of the user interface depicted in FIG. 9 is also a destination device. As shown in FIG. 9, the user interface of the device includes a window 902 that shows a view of the camera attached to the device. As also shown, the user interface includes an error message 904 indicating that the image is not properly aligned within the view of the camera. The error message 904 is displayed as a result of determination module 240 determining that the image is not properly aligned within the view of the camera. Moreover, the error message 904 is displayed by the display module 260. Although not shown in FIG. 9, other error messages may be displayed in the user interface as a result of the determination module 240 determining that the receiving of the image is not errorless.

Figure 10:
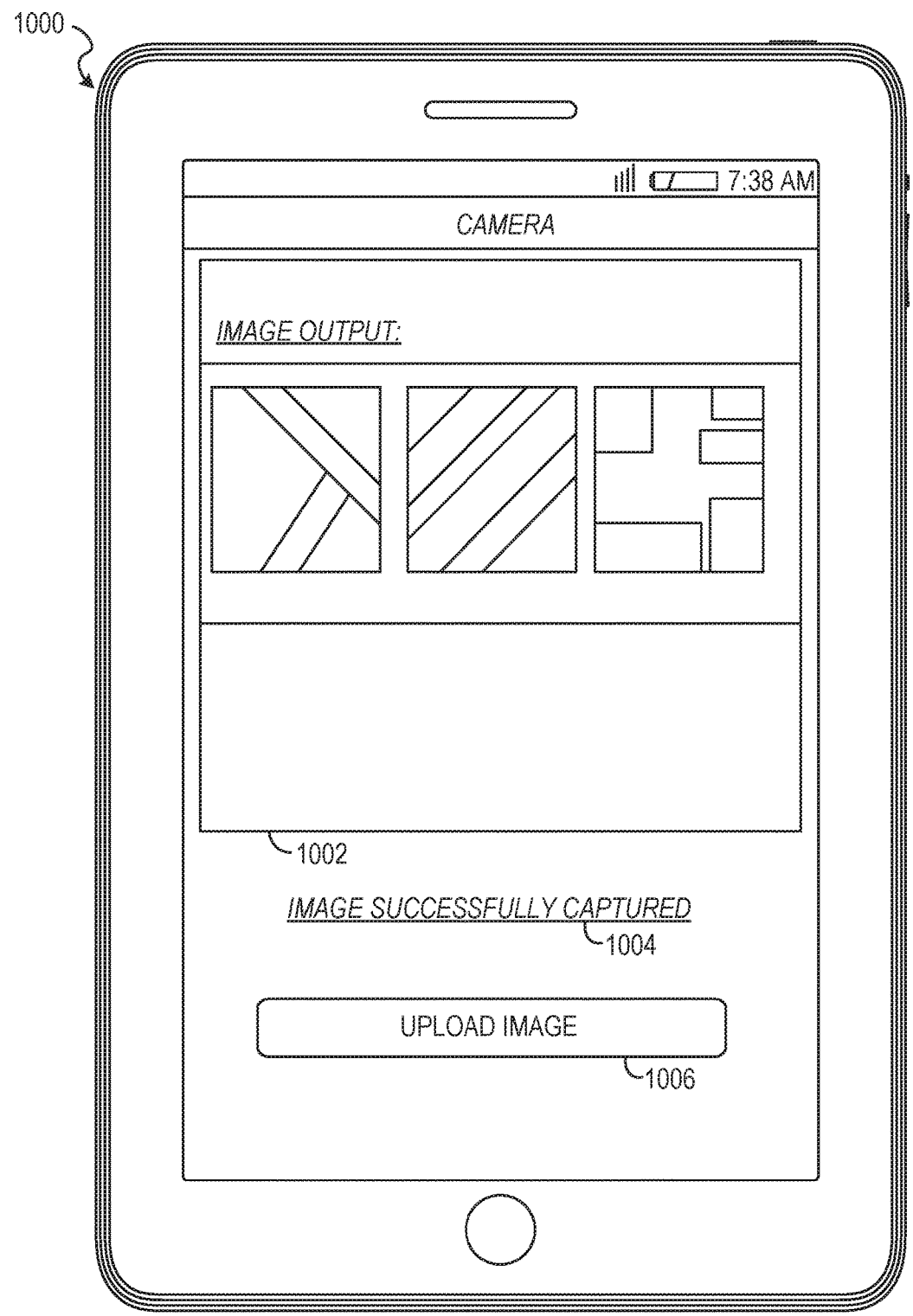
FIG. 10 is a block diagram that depicts an example user interface of a device with an attached camera, according to some example embodiments.

FIG. 10 is a block diagram 1000 that depicts an example user interface of a device with an attached camera, according to some example embodiments. As shown in FIG. 10, the user interface of the device includes a window 1002. The window 1002 depicts a view of the camera attached to the device. As also shown, the user interface includes a message 1004 and a control 1006 operable to send information (e.g., a captured image) to the data transfer system 150. The message 1004 indicates that an image is successfully captured from a screen of a source device. Further, the device on which the user interface is displayed may be an intermediate device that sends the captured image to the data transfer system 150. More specifically, the device sends the captured image to the data transfer system 150 upon operation of the control 1006.

Figure 11:
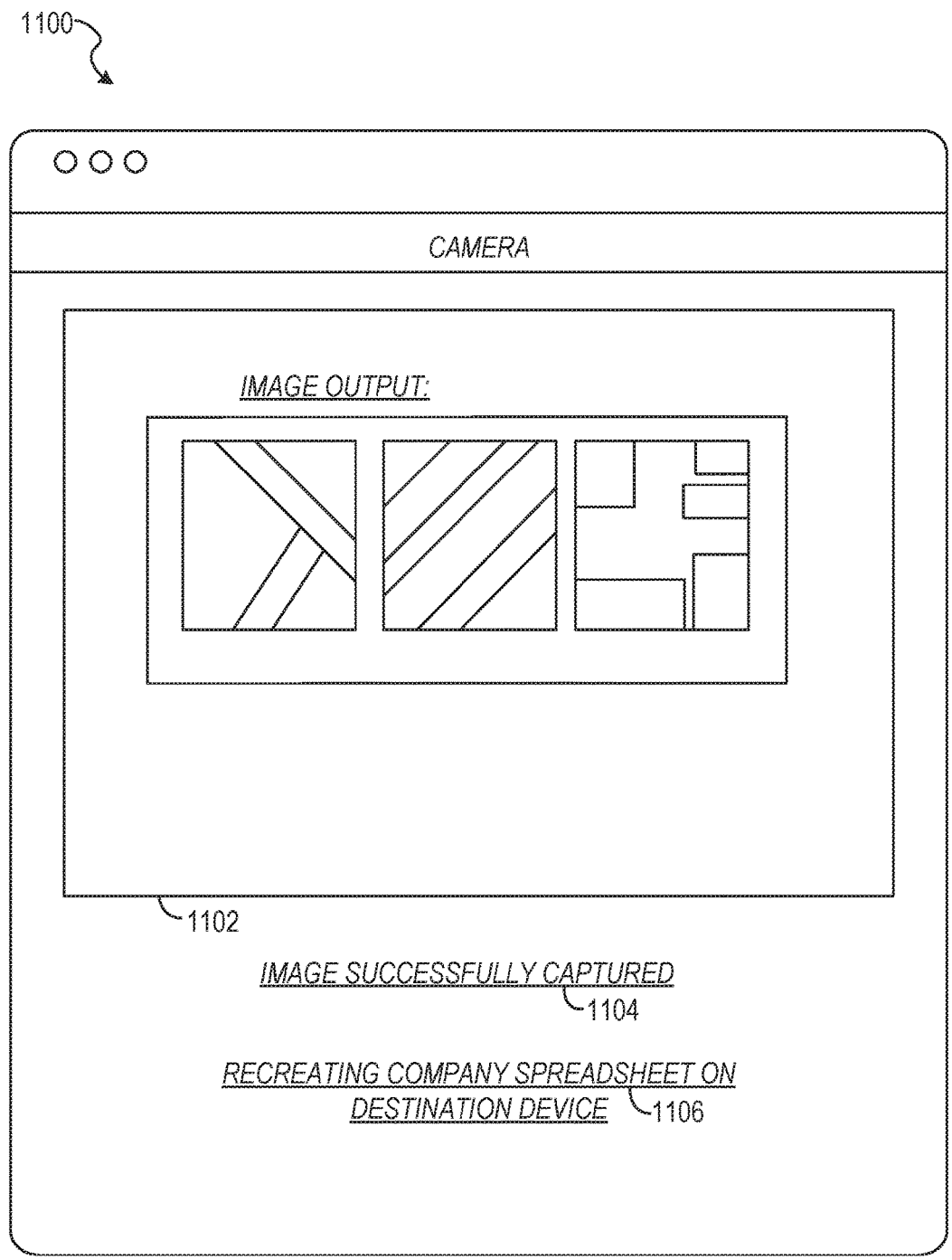
FIG. 11 is a block diagram that depicts an example user interface of a destination device, according to some example embodiments.

FIG. 11 is a block diagram 1100 that depicts an example user interface of a destination device, according to some example embodiments. As shown in FIG. 11, the user interface of the destination device includes a window 1102 that shows an image received by the destination device. The image may have been captured by a camera that is attached to the destination device. Alternatively, the image may have been received from the intermediate device. As also shown in FIG. 1, the user interface includes a first message 1104 indicating that the image has been successfully received or captured by the destination device. Further, the user interface includes a second message 1106 indicating that the generating of the further information is being performed on the destination device.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Example Machine Architecture and Machine-Readable Medium

Figure 12:
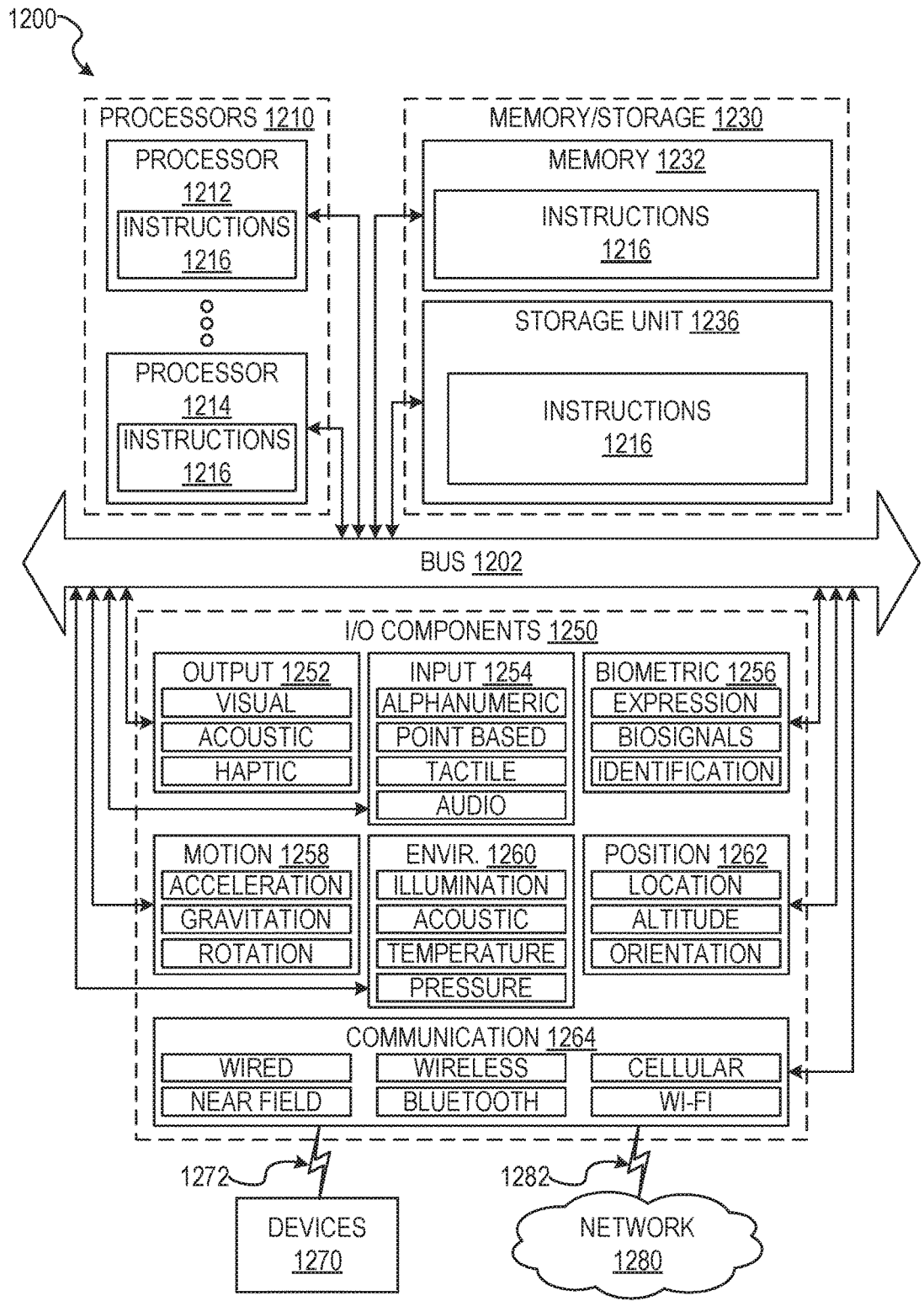
FIG. 12 illustrates a diagrammatic representation of a machine in the form of a computer system within which a set of instructions may be executed for causing the machine to perform any one or more of the methodologies discussed herein, according to an example embodiment.

FIG. 12 is a block diagram illustrating components of a machine 1200, according to some example embodiments, able to read instructions from a machine-readable medium (e.g., a machine-readable storage medium) and perform any one or more of the methodologies discussed herein. Specifically, FIG. 12 shows a diagrammatic representation of the machine 1200 in the example form of a computer system, within which instructions 1216 (e.g., software, a program, an application, an applet, an app, or other executable code) for causing the machine 1200 to perform any one or more of the methodologies discussed herein may be executed. For example the instructions may cause the machine to execute the flow diagrams of FIGS. 3-6. Additionally, or alternatively, the instructions may implement the modules of FIG. 2. The instructions transform the general, non-programmed machine into a particular machine specially configured to carry out the described and illustrated functions in the manner described. In alternative embodiments, the machine 1200 operates as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1216, sequentially or otherwise, that specify actions to be taken by machine 1200. Further, while only a single machine 1200 is illustrated, the term "machine" shall also be taken to include a collection of machines 1200 that individually or jointly execute the instructions 1216 to perform any one or more of the methodologies discussed herein.

The machine 1200 may include processors 1210, memory 1230, and I/O components 1250, which may be configured to communicate with each other such as via a bus 1202. In an example embodiment, the processors 1210 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 1212 and processor 1214 that may execute instructions 1216. The term "processor" is intended to include multi-core processor that may comprise two or more independent processors (sometimes referred to as "cores") that may execute instructions contemporaneously. Although FIG. 12 shows multiple processors, the machine 1200 may include a single processor with a single core, a single processor with multiple cores (e.g., a multi-core process), multiple processors with a single core, multiple processors with multiples cores, or any combination thereof.

The memory/storage 1230 may include a memory 1232, such as a main memory, or other memory storage, and a storage unit 1236, both accessible to the processors 1210 such as via the bus 1202. The storage unit 1236 and memory 1232 store the instructions 1216 embodying any one or more of the methodologies or functions described herein. The instructions 1216 may also reside, completely or partially, within the memory 1232, within the storage unit 1236, within at least one of the processors 1210 (e.g., within the processor's cache memory), or any suitable combination thereof, during execution thereof by the machine 1200. Accordingly, the memory 1232, the storage unit 1236, and the memory of processors 1210 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 1216. The term "machine-readable medium" shall also be taken to include any medium, or combination of multiple media, that is capable of storing instructions (e.g., instructions 1216) for execution by a machine (e.g., machine 1200), such that the instructions, when executed by one or more processors of the machine 1200 (e.g., processors 1210), cause the machine 1200 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

Furthermore, the machine-readable medium is non-transitory in that it does not embody a propagating signal. However, labeling the tangible machine-readable medium as "non-transitory" should not be construed to mean that the medium is incapable of movement—the medium should be considered as being transportable from one physical location to another. Additionally, since the machine-readable medium is tangible, the medium may be considered to be a machine-readable device.

The I/O components 1250 may include a wide variety of components to receive input, provide output, produce output, transmit information, exchange information, capture measurements, and so on. The specific I/O components 1250 that are included in a particular machine will depend on the type of machine. For example, portable machines such as mobile phones will likely include a touch input device or other such input mechanisms, while a headless server machine will likely not include such a touch input device. It will be appreciated that the I/O components 1250 may include many other components that are not shown in FIG. 12. The I/O components 1250 are grouped according to functionality merely for simplifying the following discussion and the grouping is in no way limiting. In various example embodiments, the I/O components 1250 may include output components 1252 and input components 1254. The output components 1252 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1254 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1250 may include biometric components 1256, motion components 1258, environmental components 1260, or position components 1262 among a wide array of other components. For example, the biometric components 1256 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1258 may include acceleration sensor components (e.g., accelerometer), gravitation sensor components, rotation sensor components (e.g., gyroscope), and so forth. The environmental components 1260 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1262 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1250 may include communication components 1264 operable to couple the machine 1200 to a network 1280 or devices 1270 via coupling 1282 and coupling 1272 respectively. For example, the communication components 1264 may include a network interface component or other suitable device to interface with the network 1280. In further examples, communication components 1264 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1270 may be another machine or any of a wide variety of peripheral devices (e.g., a peripheral device coupled via a Universal Serial Bus (USB)).

Moreover, the communication components 1264 may detect identifiers or include components operable to detect identifiers. For example, the communication components 1264 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals).

In addition, a variety of information may be derived via the communication components 1264, such as, location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 1280 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1280 or a portion of the network 1280 may include a wireless or cellular network and the coupling 1282 may be a Code Division Multiple Access (CDMA) connection, a Global System for Mobile communications (GSM) connection, or other type of cellular or wireless coupling. In this example, the coupling 1282 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 1216 may be transmitted or received over the network 1280 using a transmission medium via a network interface device (e.g., a network interface component included in the communication components 1264) and utilizing any one of a number of well-known transfer protocols (e.g., hypertext transfer protocol (HTTP)). Similarly, the instructions 1216 may be transmitted or received using a transmission medium via the coupling 1272 (e.g., a peer-to-peer coupling) to devices 1270. The term "transmission medium" shall be taken to include any intangible medium that is capable of storing, encoding, or carrying instructions 1216 for execution by the machine 1200, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
   capturing, using a camera of a destination device, live image data of a visual marker presented on a display of a source device;
   presenting, on a display of the destination device, the live image data of the visual marker presented on the display of the source device along with a target icon, the target icon presented at a fixed point on the display of the destination device;
   in response to determining that target icon is presented within a predetermined distance of the live image data of the visual marker on the display of the destination device, transmitting a notification to the source device that the destination device is properly aligned to receive images from the source device, the notification causing the destination device to present, on the display of the source device, one or more images that represents information stored in a memory of the source device;
   capturing, using the camera of the destination device, the one or more images that represents information stored in the memory of the source device, the one or more images having being generated by the source device using an application that converts the information that is stored in the memory into the one or more images; and
   generating, using one or more processors, further information on the destination device based on the received one or more images, the further information being a duplicate of the information that is stored in the memory of the source device.

2. The method of claim 1, wherein:
an image from the one or more images depicts one or more bits; and
each of the one or more bits displays a respective color.

3. The method of claim 2, wherein the generating the further information includes:
identifying the one or more bits depicted in the image;
generating intermediate data based on the identified one or more bits depicted in the image; and
converting the intermediate data into data that corresponds to the further information, the converting being performed using a further application that is executed on the destination device.

4. The method of claim 1, wherein:
the one or more images are included in a stream of images; and
the receiving includes receiving the stream of images.

5. The method of claim 4, wherein the generating of the further information is performed after capturing a last image from the stream of images.

6. The method of claim 4, wherein the generating of the further information is performed after capturing a first image from the stream of images.

7. The method of claim 1, further comprising:
determining that at least a first image from the one or more images captured from the source device is errorless.

8. A destination device comprising:
one or more computer processors; and
one or more non-transitory computer-readable mediums storing instructions that, when executed by the one or more computer processors, cause the destination device to perform operations comprising:
capturing, using a camera of the destination device, live image data of a visual presented on a display of a source device;
presenting, on a display of the destination device, the live image data of the visual marker presented on the display of the source device along with a target icon, the target icon presented at a fixed point on the display of the destination device;
in response to determining that target icon is presented within a predetermined distance of the live image data of the visual marker on the display of the destination device, transmitting a notification to the source device that the destination device is properly aligned to receive images from the source device, the notification causing the destination device to present, on the display of the source device, one or more images that represents information stored in a memory of the source device;
capturing, using the camera of the destination device, the one or more images that represents information stored in the memory of the source device, the one or more images having being generated by the source device using an application that converts the information that is stored in the memory into the one or more images; and
generating, using one or more processors, further information on the destination device based on the received one or more images, the further information being a duplicate of the information that is stored in the memory of the source device.

9. The destination device of claim 8, wherein an image from the one or more images depicts one or more bits, and each of the one or more bits displays a respective color.

10. The destination device of claim 9, wherein the generating the further information includes:
identifying the one or more bits depicted in the image;
generating intermediate data based on the identified one or more bits depicted in the image; and
converting the intermediate data into data that corresponds to the further information, the converting being performed using a further application that is executed on the destination device.

11. The destination device of claim 8, wherein the one or more images are included in a stream of images, and the receiving includes receiving the stream of images.

12. The destination device of claim 11, wherein the generating of the further information is performed after capturing a last image from the stream of images.

13. The destination device of claim 11, wherein the generating of the further information is performed after capturing a first image from the stream of images.

14. The destination device of claim 8, the operations further comprising:
determining that at least a first image from the one or more images captured from the source device is errorless.

15. A non-transitory computer-readable medium storing instructions that, when executed by one or more computer processors of a destination device, cause the destination device to perform operations comprising:
capturing, using a camera of the destination device, live image data of a visual marker presented on a display of a source device;
presenting, on a display of the destination device, the live image data of the visual marker presented on the display of the source device along with a target icon, the target icon presented at a fixed point on the display of the destination device;
in response to determining that target icon is presented within a predetermined distance of the live image data of the visual marker on the display of the destination device, transmitting a notification to the source device that the destination device is properly aligned to receive images from the source device, the notification causing the destination device to present, on the display of the source device, one or more images that represents information stored in a memory of the source device;
capturing, using the camera of the destination device, the one or more images that represents information stored in the memory of the source device, the one or more images having being generated by the source device using an application that converts the information that is stored in the memory into the one or more images; and
generating, using one or more processors, further information on the destination device based on the received one or more images, the further information being a duplicate of the information that is stored in the memory of the source device.

16. The non-transitory computer-readable medium of claim 15, wherein an image from the one or more images depicts one or more bits, and each of the one or more bits displays a respective color.

17. The non-transitory computer-readable medium of claim 16, wherein the generating the further information includes:
identifying the one or more bits depicted in the image;

generating intermediate data based on the identified one or more bits depicted in the image; and converting the intermediate data into data that corresponds to the further information, the converting being performed using a further application that is executed on the destination device.

18. The non-transitory computer-readable medium of claim 15, wherein the one or more images are included in a stream of images, and the receiving includes receiving the stream of images.

19. The non-transitory computer-readable medium of claim 18, wherein the generating of the further information is performed after capturing a last image from the stream of images.

20. The non-transitory computer-readable medium of claim 18, wherein the generating of the further information is performed after capturing a first image from the stream of images.

\* \* \* \* \*